Jan. 14, 1964   A. R. HUBBARD   3,117,321
FASTENER INSERTING MACHINES
Filed Oct. 26, 1961   6 Sheets-Sheet 2

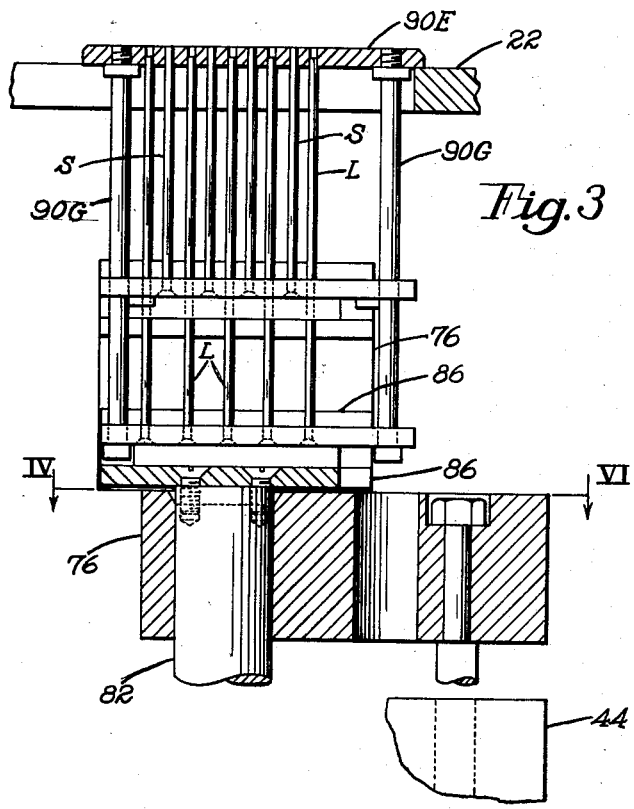
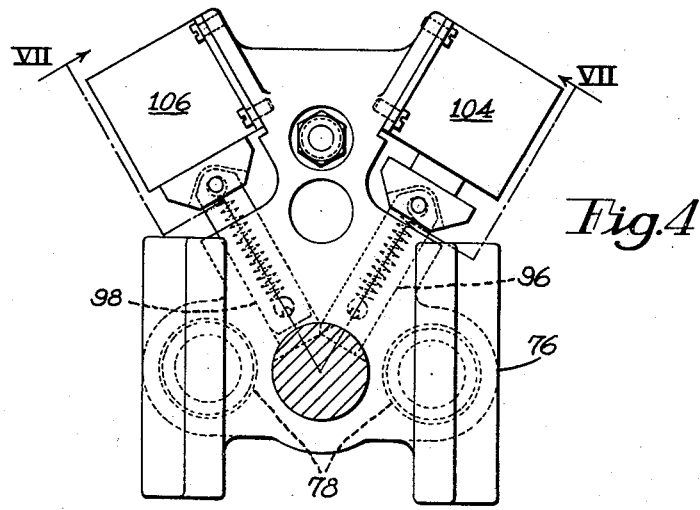

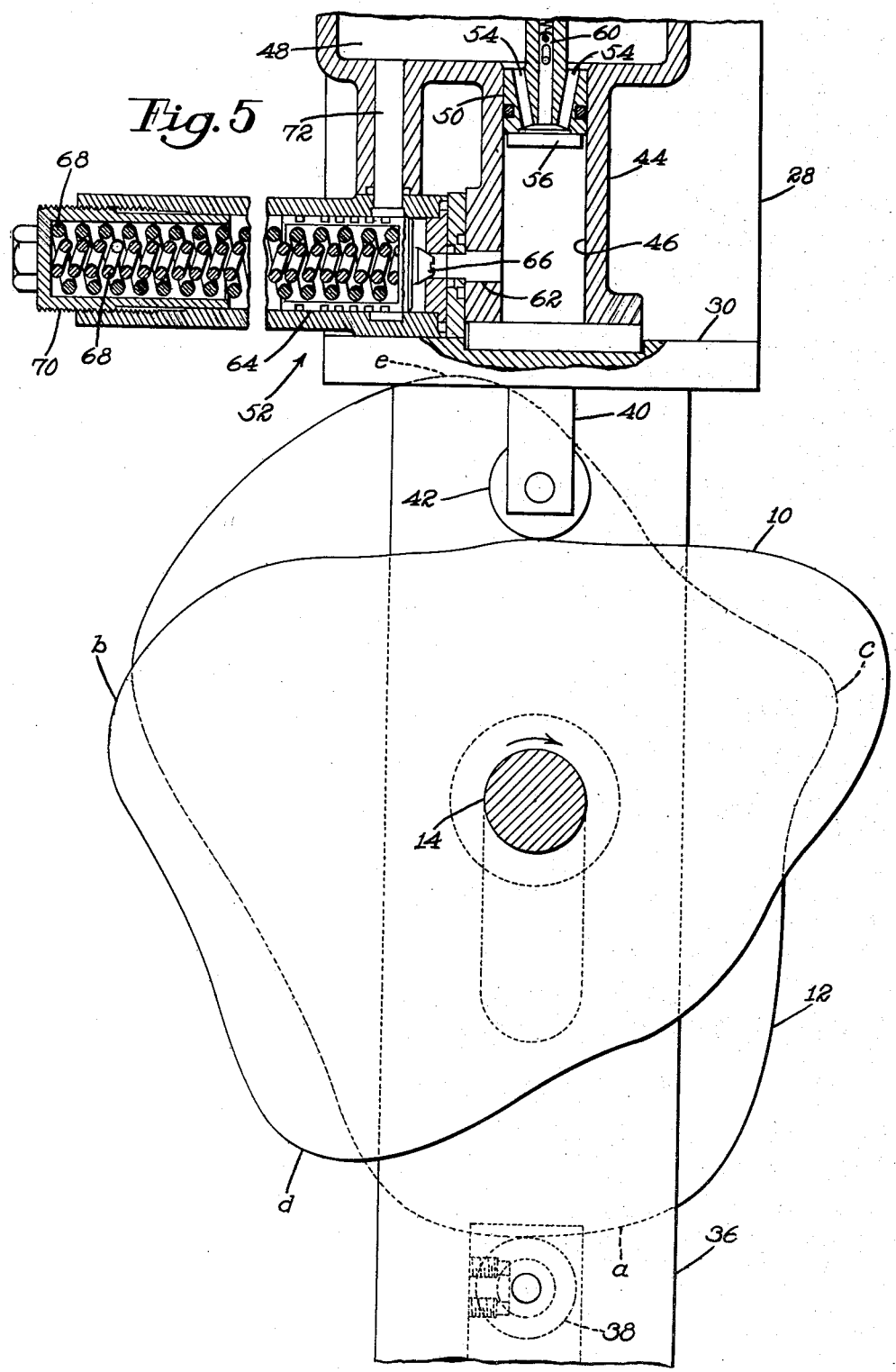

United States Patent Office 3,117,321
Patented Jan. 14, 1964

3,117,321
FASTENER INSERTING MACHINES
Arthur R. Hubbard, Beverly, Mass., assignor to United Shoe Machinery Corporation, Boston, Mass., a corporation of New Jersey
Filed Oct. 26, 1961, Ser. No. 147,962
10 Claims. (Cl. 1—301)

This invention relates to fastener inserting machines for simultaneously driving a series of fiber or metal slugs into a work piece that is assembled upon a work support. Due to the fact that slug type fasteners are seldom provided with a pointed end to assist in their penetration and guidance into a work piece, it is necessary first to prick or prepunch the work piece, for receiving the slug fasteners, by a pricking operation in which an awl-like tool punches a hole of adequate size to permit the slug, without buckling or breaking, to penetrate the work piece. Where a series of slugs are to be driven simultaneously, it is customary to employ a series of hardened steel driving tools in gang fashion; first with a pricking stroke to form a plurality of holes in the work piece, and then with a driving stroke to insert and drive a slug into each preformed hole.

In United States Patent No. 2,956,284, issued October 18, 1960, in the name of Basil A. Strout, there is disclosed a fastener inserting machine particularly adapted to the forming and inserting of slug type fasteners in gang fashion for securing the heel seat portion of a lasted shoe assembled on a shoemaking last. In the operation of the machine of said patent, a lasted shoe is presented to the machine with the heel seat portion that is to be fastened facing downward and positioned directly upon a heel seat supporting block. This block, which is referred to as the work support, is provided with numerous heightwise extending passageways through which the driver tools and the slug fasteners may be moved upward through the work support and into engagement with the shoe parts to be fastened. In positioning the work, so as properly to orient the heel seat of a given shoe with respect to the chosen pattern in which the series of fasteners are to be inserted into the shoe through said passageways, the machine operator is aided by two sets of heel end centering devices which, when the heel end is properly oriented, actuate a series of microswitches to initiate the automatic operation of the machine. First the lasted shoe is clamped in position upon the work support by a vertically movable holddown member which descends under spring pressure forcefully to engage the upper cone of the last above the heel seat portion, thus to lock the work pieces against heightwise displacement during the upward actuation of the drivers in both their pricking and subsequent driving strokes. Since the upward limit to which the ends of the drivers must penetrate the work on their pricking stroke, before reaching the last bottom, will vary from shoe to shoe depending upon the thicknesses of the work pieces encountered at the heel seat, a cam mechanism for actuating the pricking stroke of the drivers is designed to provide for the maximum driver elevation that will ever be required. Accordingly, an overthrow of heightwise movement is imparted to a driver carrier assembly upon which is mounted a hydraulic piston cylinder having a piston with a driver operating plunger extending upwardly out of said cylinder. The driver unit assembly is affixed to the upper end of the plunger, and the lower end of the plunger is yieldably supported within the cylinder by hydraulic pressure under the control of a maximum pressure regulating valve which may be adjusted to limit the upward force, that can be transmitted through the hydraulic fluid to the drivers, to a magnitude sufficient to penetrate the work pieces but less than the downward force exertable by the shoe holddown member.

In the machine of the patent, the driver ends are all flush with one another and, in the at rest machine position, they are spaced downward a considerable distance beneath the bottom of the work support block. However, as soon as the holddown clamping pressure has been applied to the work above the work support, a power driven clutch is engaged to commence the rotation of a matched pair of conjugate cams whose follower rolls are mounted on the driver carrier assembly for positively reciprocating the carrier up and down along pairs of vertical guideways secured to the machine frame. The first upward movement of the carrier assembly and hydraulic cylinder thereon lifts the driver unit in a pricking stroke which extends upward through the work support and into penetration with the work pieces until the driver ends approach the metal heel plate of the shoe last, whereupon the resistance to further upward penetration increases to such a degree that the resulting pressure increase in the hydraulic fluid beneath the driver operating plunger activates the fluid control valve to allow the escape of fluid from the cylinder during the remainder of the upward travel of the carrier assembly, and thus to stop the pricking stroke of the drivers as soon as they have completed their penetration of the work pieces. Further rotation of the cams returns the driver carrier and drivers downward to their initial lowered position. Having completed the pricking stroke to provide a series of holes in the work for receiving the fasteners, a loader block which has been preloaded with the requisite number of slugs is removed from its fastener receiving location into its fastener driving location, between the ends of the lowered drivers and the bottom of the work support block, so that a fastener is then alined in the path of each driver. Further rotation of the cams commences the second upward movement of the carrier assembly, during which driving stroke the ends of the drivers move upward into engagement with the lower end of the fasteners which, upon continued movement of the drivers, are pushed from their loader block through the passages of the work support block and then are driven upward into the pricked holes in the work pieces. Since the force required to drive and seat the fasteners flush with the pricked openings is far less than that previously needed to prick the holes, the pressure buildup in the hydraulic fluid during the fastener driving stroke is not sufficient to operate the relief valve for terminating the movement of the drivers. Therefore, the carrier operating cam curve for the driving stroke is designed to lift the carrier assembly and driver units just high enough to seat the bottom of the fasteners flush with the bottom of the work piece. During the continued rotation of the cams, the driver unit is again retracted, the holddown member is lifted so that the finished work may be removed from the machine, and the fastener loader block is moved to its fastener receiving position where a set of new fasteners are then formed preparatory to the next machine cycle.

Although, in the construction of the patented machine, the provision of the above-mentioned hydraulic pressure regulating valve was intended to assure that the pricking stroke movement of the drivers ceased before the unyielding pressure of the drivers against the metal last bottom caused damage to either the drivers or the last, extensive use of said machine demonstrated the ineffectiveness of the intended safeguard against such damage. Not only were one or more drivers frequently broken, during the pricking stroke, but the excessive pressures exerted through the drivers during said stroke caused permanent damage to the shoe lasts. In the heel seat fastening of a large size shoe, where as many as twenty-two fasteners are customarily inserted around the heel end portion, an aggregate force in the realm of three tons, exerted upwardly, is required to assure that all of the drivers penetrate the combined thicknesses of the shoe parts during the pricking stroke until the ends of the drivers reach the metal last bottom. The pressure required to prick a hole, particularly as the pricking driver approaches the last bottom with portions of highly compacted shoe stock material interposed between the driver end and the metal last bottom, far exceeds the pressure needed to drive a slug type fastener into said hole. However, the downward holding force that is applied to the work clamping holddown must be sufficient to overcome the greatest driver-exerted forces that may be encountered in the normal operation of the machine. Therefore, in the machine of the patent it was necessary to load the cone of the shoe last with a downward force of such a magnitude that, not infrequently, damage occurred to the relatively thin and weak cone portion of the last. In addition, when an aggregate driving force of such a high magnitude is required to accomplish the desired pricking of the work, driver breakage occurs too frequently. This is especially true when a driver encounters an obstruction, such as a lasting tack disposed in the path of the driver pricking stroke, because such a relatively unyielding obstruction in the path of a single driver causes substantially the entire available driving force to become concentrated throughout said driver. Also, in the fastening of small shoes, wherein substantially fewer fasteners are required to be inserted, the force transmitted through each driver is increased correspondingly in accordance with the fewer number of drivers being employed.

Accordingly, the object of the present invention is to provide an improved driver operating mechanism that will eliminate both driver breakage and damage to the shoe lasts.

One of the advantageous features of the invention is that my novel driver operating mechanism enables both the pricking of the work pieces and the driving of the fasteners to be accomplished by using only one half of the maximum force that was previously required. To this end, a feature of the invention resides in the provision of a driver assembly having a pair of divided driver units in each of which half of the drivers are mounted.

Another feature is that the pricking operation is accomplished in two distinct strokes, instead of one. During the first stroke, only one of the driver units is power actuated to prick half the required number of holes; on the second stroke, the other driver unit is also power actuated to prick the remaining holes.

Still another feature of this invention is the provision of a power actuated plunger shaft to which one set of drivers is rigidly affixed, while the other driver set is only connected to the plunger shaft by a pair of releasable latches which are alternately engaged to regulate the height of one set of driver ends with respect to the other set of drivers.

The above and other features of the invention will appear more fully from the detail description, when read in connection with the accompanying drawings, and will be pointed out in the claims.

In the drawings:

FIG. 3 is a section on line III—III of FIG. 2 and showing details of the driver units;

FIG. 4 is a section along line IV—IV of FIG. 3 looking in the direction of the arrows, and showing the latching mechanism;

FIG. 5 is a right side elevation showing the driver actuating cams and the lower portion of the driver operating mechanism;

Figure 1:
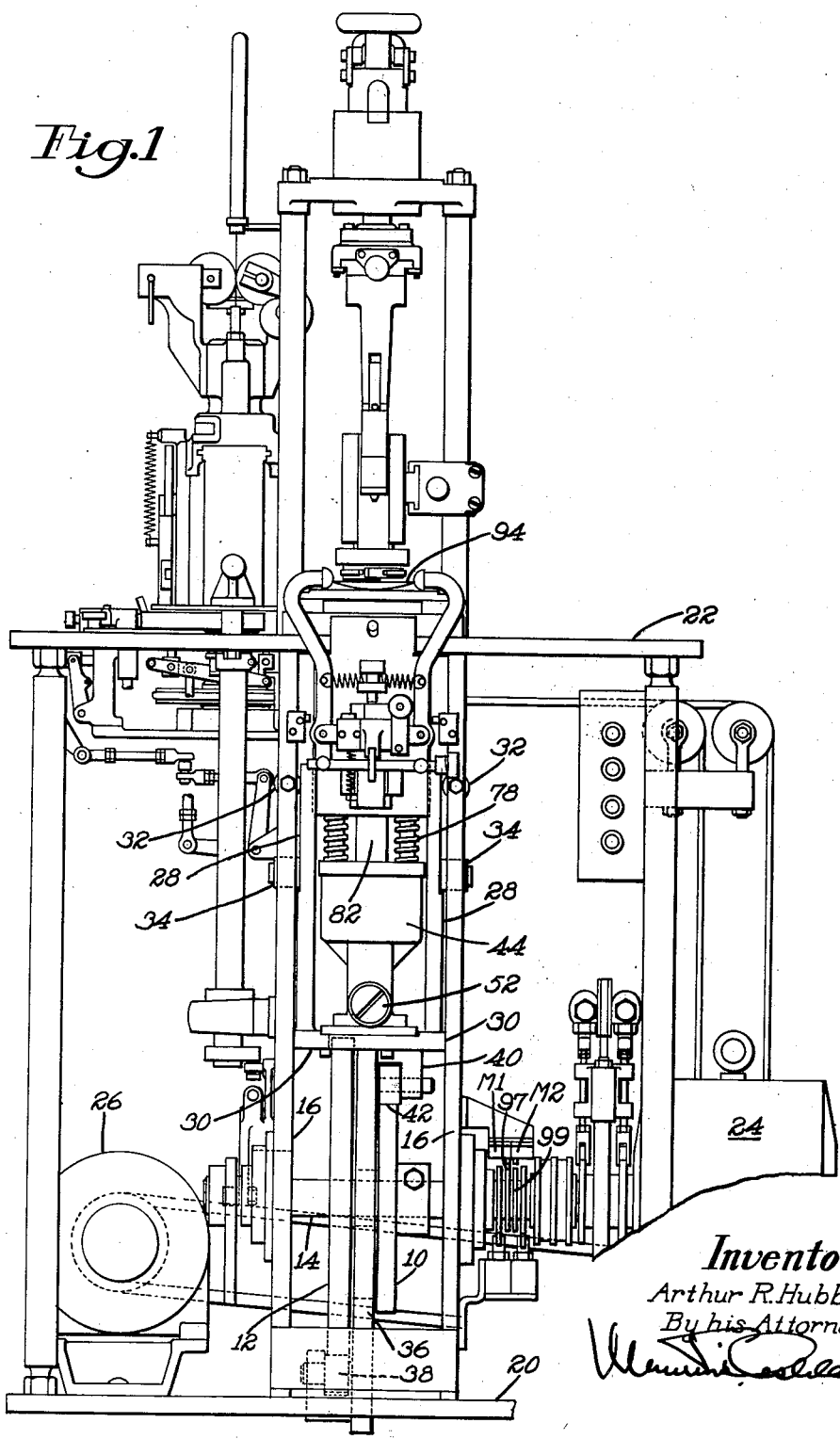
FIG. 1 is a front elevation of a fastener inserting machine provided with the improved driver operating mechanism of this invention, and as seen in the at rest position.

The improved driver operating mechanism of the present invention is illustrated in FIG. 1 as being embodied in a shoe machine, for heel seat fastening, similar to the machine disclosed in the above-mentioned United States Patent No. 2,956,284. Since, with the exception of the mechanism for actuating the drivers to prick the work and to drive the fastener, the construction and the operation of the present machine are identical to the construction and operation of the machine of the patent, the following description will be confined to the construction and operation of the improved driver operating mechanism.

Referring to the drawings, and particularly to FIG. 1, the heightwise reciprocating movement that is repetitively imparted to the driver units during each operating cycle of the machine is derived from a pair of triple lobed conjugate cams, 10 and 12, both keyed to a drive shaft 14 which is rotatably journaled in bearings secured to the outer sides of a pair of frame plates 16 which extend between and are rigidly affixed to a base frame plate 20 at their lower ends and a table frame plate 22 at their upper ends. The shaft 14 is directly coupled to a gear reduction unit 24 which is power driven (through a clutch assembly not shown) by a continuously operating motor 26.

The reciprocating portion of the driver operating mechanism is attached to a driver carrier case comprised of a pair of parallel vertical carrier side plates 28 both of which are rigidly secured at their lower ends to a cross brace member 30. The side plates 28 are horizontally alined, adjacent to and between the pair of frame plate members 16 for heightwise reciprocating movement in the desired fixed path, by two sets of eccentrically bored guide rolls 32, 34 which cooperate between the pairs of parallel plates 16 and 28 to guide the movement of the driver carrier case (in the same manner as the sets of adjustable guide rolls 158 and 164 disclosed in the machine of the patent). A tongue 36 (FIG. 5), extending downward from the cross brace 30, has a cam roll 38 mounted on its lower end for engagement with the bottom peripheral portion of the cam 12. Also attached to the bottom of the cross brace 30 is a bracket 40 on which is mounted a cam roll 42 engageable with the top of cam 10. Thus, as the conjugate cams are rotated, the driver carrier case is periodically elevated by the contours of cam 10 acting to force the roll 42 and cross brace member 30 upward; and the alternate periodic downward retraction of the case is provided by the complementary contours of cam 12 acting with a downward force on the roll 38.

Mounted directly on top of the cross brace 30 is a hydraulic cylinder and a driver actuating piston assembly comprised of a housing 44 containing hydraulic fluid, a cylinder bore 46, a fluid reservoir 48 above the bore and normally sealed therefrom by a piston 50 movable vertically in the bore 46. An adjustable fluid pressure dump valve, designated generally by the arrow 52, is also provided for venting fluid under pressure from the bore 46 into the reservoir 48 in a manner which will be hereinafter fully described. A circular series of ducts 54, leading through the piston 50 into the reservoir, are sealed against the passage of fluid, from the bore 46 into the reservoir, by a flapper type check valve 56 which is normally held seated against the bottom face of the piston by a yieldable spring 58 (FIGS. 2 and 8) attached to the valve guide stem 60. The reservoir 48 is ported to the atmosphere above the surface of its fluid; hence, while pressurized fluid cannot pass from the cylinder bore 46 into the reservoir through the ducts 54, as soon as the fluid pressure in the cylinder is removed, in response to an upward movement of the piston 50, the atmospheric pressure, acting on the head of the check valve 56 will cause the spring 58 to yield and allow fluid to pass through the ducts and into the cylinder bore.

The dump valve 52 is comprised of a cylindrical casing, the interior bore of which is connected at one end, by a small diameter passage 62, with the lower portion of the cylinder bore 46. A piston sleeve 64, whose movement controls the actuation of the dump valve, carries a valve head 66 which normally is maintained seated against the opening of the passage 62 by springs 68 nested between the piston sleeve 64 and a cap sleeve 70 adjustably threaded into the other end of the casing bore, so that the spring pressure tending to hold the valve head 66 against its seat may be regulated in accordance with the maximum fluid pressure that is desired to be exerted upon the piston 50 in the bore 46. A passage 72, the upper end of which leads into the fluid reservoir 48, connects with the interior of the dump valve casing, but, when the valve is in the closed condition illustrated in FIG. 5, this passage is sealed by the peripheral end portion of the piston sleeve 64. However, in the operation of the machine when a predetermined desired pressure has been built up within the cylinder bore 46, said pressure, acting upon the small diameter pressure area of the valve head 66, shifts the piston sleeve 64 backward against the force of the springs 68, thereby to admit high pressure upon the much larger pressure area of the entire head of the piston sleeve 64, with the result that said sleeve rapidly moves to uncover the passage 72, thereby allowing the pressurized fluid in the cylinder bore beneath the piston 50 to escape into the reservoir 48. When the valve head 66 of the dump valve is closed, the fluid pressure in the bore 46 can exert its force upon the small exposed area of the valve head 66, which area is about $\frac{1}{10}$ the entire cross sectional area of the piston sleeve 64. Therefore, if the effective force of the springs 68 is adjusted to hold the valve head 66 seated against fluid pressures, up to 1,000 p.s.i. acting only upon the small exposed area, as soon as the pressure in the bore 46 exceeds 1,000 p.s.i. the valve head 66 will be cracked away from its seat thus exposing an area ten times larger to the effect of the pressure. Now, a pressure in the bore 46 of only about 100 p.s.i. is sufficient to hold the dump valve open so that fluid may pass up into the reservoir 48.

The upper ends of the pair of driver carrier side plates 28 (FIG. 2) are provided with splines 74 for guiding, for vertical movement upon the carrier, a driver unit holder 76 which is yieldably supported, spaced upwardly from the top of the housing 44, by resilient coil springs 78, each having its upper end nested in a counterbore in the bottom of the holder assembly 76 and its lower end, centered by a guide sleeve 80, within a counterbore provided in the top of the housing 44.

Figure 2:
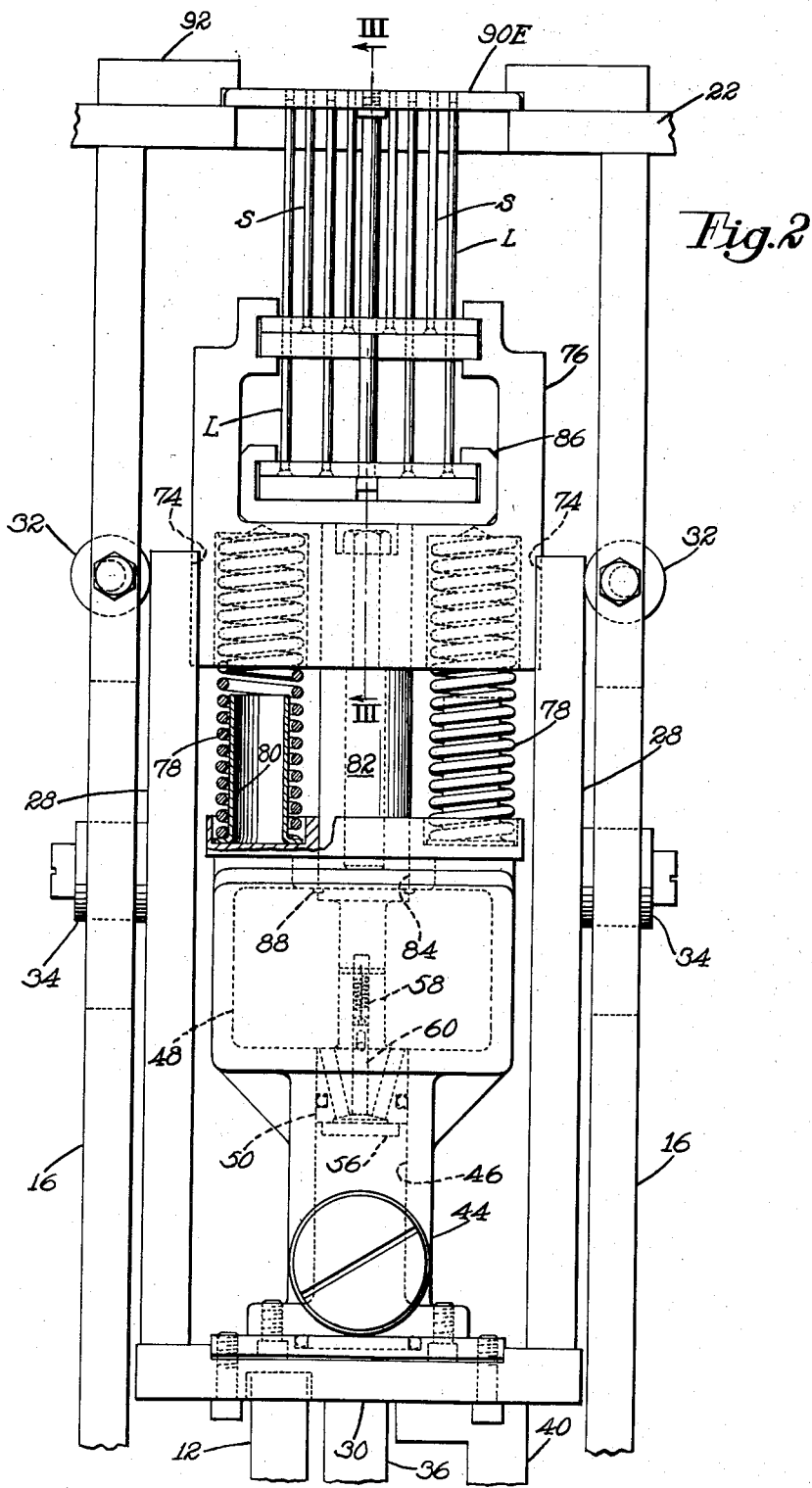
FIG. 2 is a front elevation of parts of the driver operating mechanism, as viewed in the at rest position of the machine.

The driver actuating piston 50 is provided with an integral piston shaft 82 extending upwards through a bushing 84 in the top of the housing 44, and the upper end of the shaft 82 is slidably journaled through the base of the holder assembly 76 (FIGS. 2 and 3). Slidably housed within the central portion of the holder assembly 76 is another driver unit holder 86 secured to the upper end of the shaft 82, so that the holder 86, which will hereinafter be referred to as the lower driver unit holder, is positively moved, either up or down, by any heightwise movement of the piston 50. Since the forces of the compression springs 78 are always tending further to elevate the holder assembly 76 above the housing 44, and since the assembly 76 cannot be elevated without an accompanying movement of both the holder 86 and the piston shaft 82, a snap ring 88 (FIG. 2), attached to the shaft and adapted to abut against the lower face of the bushing 84, restricts the upward relative movement of the shaft 82 with respect to the housing 44, thus establishing the heightwise distance apart that the driver holders normally will be elevated above the housing 44 by the yieldable force of the springs 78.

Figure 6:
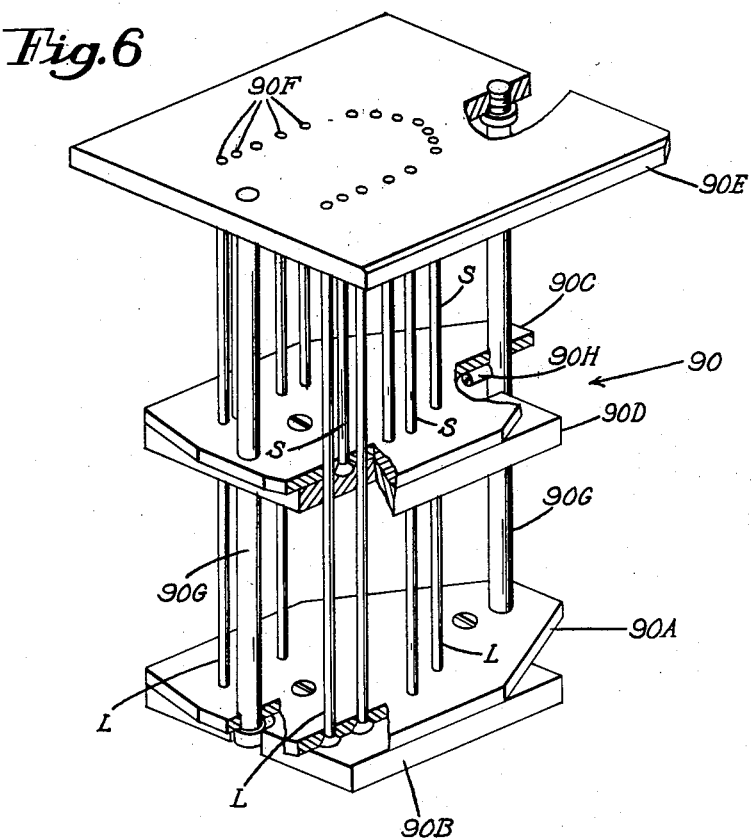
FIG. 6 is a perspective view of the driver head assembly removed from the machine.

The tools for sequentially pricking the work pieces and for driving the fasteners are mounted in a driver head assembly 90 (FIG. 6), and these tools, or drivers, are assembled in two separate groups as illustrated. One group, which will be referred to as the lower driver unit, is comprised of a series of long driver rods L having their lower headed ends securely locked between a lower driver block 90A and a retaining plate 90B. The other group of drivers, which will be referred to as the upper driver unit, is comprised of a series of shorter driver rods S similarly secured in position by an upper driver block 90C and a retaining plate 90D. The block 90C and the plate 90D are both provided with a series of holes through which the drivers L of the lower driver unit may be reciprocated heightwise. A driver guide plate 90E, at the top of the driver head assembly, is provided with a series of passages 90F through which the free ends of all the drivers may pass upwardly when the respective driver units are elevated. The entire driver head assembly 90 is maintained in assembly and in alining condition by a pair of tie rods 90G slidably journaled through the driver block and retainer plate members of both the upper and lower driver units. The upper end of each rod 90G is securely threaded into the driver guide plate 90E, and each lower end is provided with an enlarged head for retaining the driver units on the rods. The upper driver unit normally is maintained at a considerable level above the lower driver unit by a pin 90H transversely secured to each of the rods 90G. The retaining plate 90D of the upper driver unit is normally supported upon the pins 90H whenever the driver head assembly is removed from the machine, as represented in FIG. 6.

Figure 8:
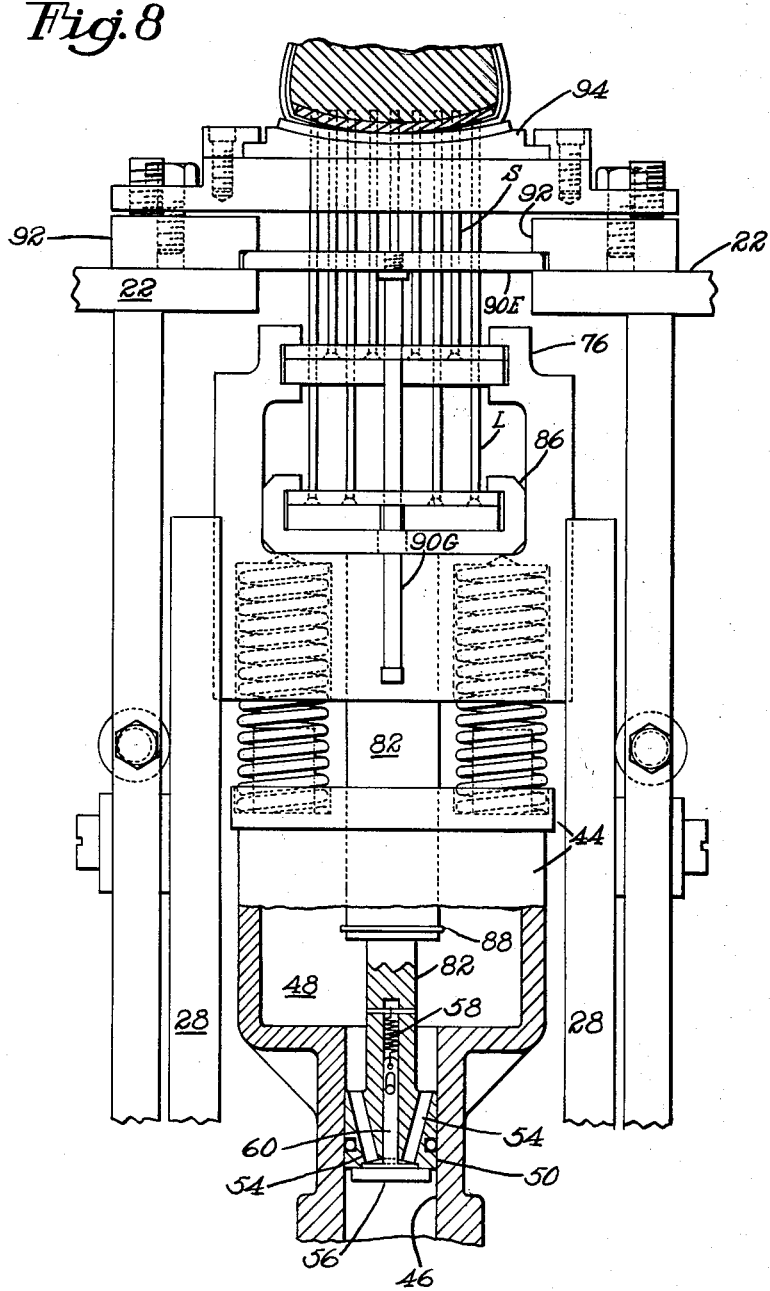
FIG. 8 is a view similar to that of FIG. 2, but illustrating the position of the driver operating mechanism at the end of the second pricking stroke.

With the machine in its at rest position, the driver head assembly 90 may be readily inserted into the driver holder assembly 76 by alining the lower horizontal portion of the respective driver units for sliding movement into matching spline grooves provided on both the holder assembly 76 and the holder 86. When the driver units are thus alined and pushed into their respective holders, the driver guide plate 90E will slide upon the upper surface of the frame plate 22, with its opposite side edges located between a pair of adjustable guide blocks 92 (FIG. 8). The blocks 92, secured to the frame plate 22, serve as a mounting for the work supporting block 94, which is spaced apart heightwise a considerable distance above the driver guide plate 90E. The work supporting block 94 (corresponding to the work support 10 of the machine disclosed in the patent) has an upper surface which is cupped to shape the heel seat of a shoe, and is provided with a series of perforations suitable for accommodating different sizes of shoes or different fastening designs. The perforations are alined with the path of the drivers which pass upwards through the block 94 to prick the heel seat of a shoe, which has been located and clamped downwards upon the work supporting block.

Figure 7:
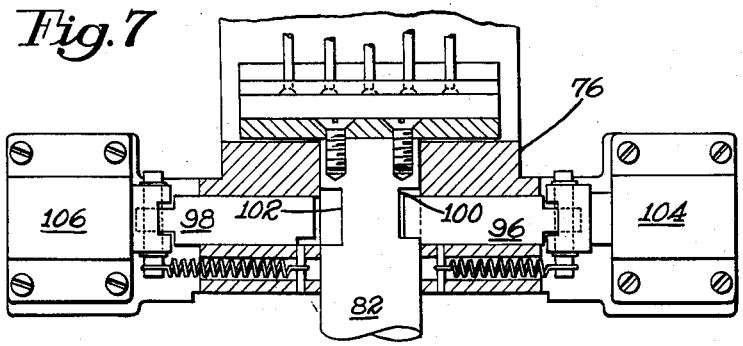
FIG. 7 is a sectional view, taken along the lines VII—VII of FIG. 4, modified to illustrate schematically the operation of the latching mechanism at the start of the second pricking stroke.

While the lower driver unit holder 86 is directly connected by and moved as a unit with the plunger shaft 82 each time the shaft is reciprocated, the holder assembly 76, for moving the upper driver unit, is moved by the shaft only when either of a pair of releasable latches are in engagement to unite the holder assembly 76 with the shaft 82. These latches for operating the upper driver unit are illustrated in FIGS. 3, 4 and 7, wherein one latch 96 is shown engaged with the shaft 82, while the other latch 98 is disengaged. Each latch is slidably mounted in one of a pair of horizontal bores provided in the base portion of the assembly 76, and the latches are both spring biased to shift the free end of the respective latches into notched recesses 100 and 102 cut transversely into adjacent portions of the shaft 82. It is to be noted that some clearance is provided at the lower end of the latch 98 where it engages the bottom wall of the notch 102, so that, when the latch 98 is moved into its engaging position within the notch 102, the shaft 82 and lower driver unit may move slightly upwards before the latch becomes engaged abuttingly by the shaft. The purpose for thus permitting the lower driver unit to move slightly upwards before the upper driver unit becomes operatively connected to the shaft 82 by the latch 98 will be explained later. The latches 96 and 98 may be selectively withdrawn and held out of their respective engagement position by solenoids 104 and 106, which are energized in proper sequence by cam controlled switches, which are shown in FIG. 1, wherein the right hand side of the cam shaft 14 is provided with pair of cams 97 and 99 having associated therewith and respectively a pair of micro-switches $M^1$ and $M^2$ for actuating their respective solenoids 104 and 106 thereby to control the actuation of the latches 96 and 98 in timed relation to the operation of the driver units.

Since in accord with a feature of this invention it is desirable that the pricking of a work piece be accomplished in two separate pricking strokes, employing first only the long drivers of the lower driver unit, and afterwards the drivers S of the upper driver unit, drivers L of the lower unit have their upper ends normally disposed slightly beneath the level of the upper unit driver ends (FIGS. 2 and 3); thus during the second pricking stroke when the upper driver unit is connected by latch 96 to the shaft 82, the ends of the upper unit drivers S will enter the work in advance of the drivers L which, having already pricked the work piece on their first stroke, now may enter the prepricked holes a short distance, but preferably do not penetrate the full depth of said holes. Thus, during the second pricking stroke, resistance to penetration of the work is encountered only by the drivers S of the upper driver unit.

Since, after the pricking of the work piece has been completed, it is necessary that the fastener driving stroke be accomplished with the ends of all the drivers in flush relationship, the actuation of the upper driver unit, through engagement of the latch 98 during the fastener driving stroke, is slightly delayed because of the before mentioned clearance in the latch 98, so that the drivers L of the lower driver unit will move up flush with the ends of the drivers S before the latch 98 becomes abuttingly engaged by the shaft 82, forcefully to apply upward pressure to the upper driver unit as well as to the lower driver unit.

The operation of the machine will now be described, commencing with the machine in its idle or at rest position, and with the motor 26 rotating the driving clutch member. The solenoids 104 and 106 at this time are both energized to hold their respective latches 96, 98 out of engagement with the driver operating shaft 82. With the driver actuating mechanism in the at rest condition of the machine (FIGS. 1, 2, 3 and 5), the driver carrier members 28, 30, the driver holder assembly 76 and the housing 44 are all in their lowermost position, as established by the lobe a (FIG. 5) on cam 12 acting on the roll 38. The piston 50 is in its uppermost position with respect to the length of the cylinder bore 46, and the bore 46 beneath the piston 50 is completely filled with hydraulic fluid, at atmospheric pressure, which is sealed in the bore 46 by the check valve 56 and the dump valve 52.

To initiate the automatic series of operations of the machine, the operator locates the heel seat portion of a shoe upon the work supporting block 94, whereupon, and in the same manner as previously described in said Letters Patent, the work piece is operatively clamped downward upon the block 94 by a holddown member. However, since only half the required number of fastener receiving holes are to be pricked at one time, only half of the previous amount of force will be required to be exerted upon the work piece by the holddown member, in order to keep the work piece seated upon the supporting block 94. Also as previously described, the acts of positioning and clamping the shoe automatically engage the clutch to commence the rotation of the drive shaft 14. As the cams move, in the clockwise direction, as viewed in FIG. 5, the lobe b on the cam 10 causes the driver carrier 28, 30 to be elevated, thereby lifting the housing 44, and, through the fluid and piston 50 in the bore 46, causing the shaft 82 to move upward with the driver carrier until the free ends of the drivers L of the lower driver unit are projected upward through the work supporting block 94 and are pressed into penetration with the work to perform the first pricking stroke. Since during this pricking stroke the holder assembly for the upper driver unit is not latched to the shaft 82, the drivers S are urged upwards against the work piece only by the resilient force of the springs 78 as they are elevated by the upward movement of the housing 44. The resistance to penetration which is encountered as soon as the drivers S contact the work causes the springs 78 to yield, thus allowing the upper driver unit to remain stationary while the lower unit continues upwards. The resistance encountered by the drivers of the lower unit increases as their penetration progresses, and the pressure build up in the hydraulic fluid which is forcing the piston 50 upwards increases in proportion to said resistance. As the ends of the drivers L arrive into proximity with the metal heel plate on the last, the hydraulic pressure of the fluid in the cylinder bore 46 reaches the peak pressure at which the dump valve is adjusted to yield and unseat the valve head 66, thus exhausting fluid from the bore 46, through the passage 62, into the reservoir 48. After the actuation of the dump valve sleeve 64, the remaining upward movement that may be imparted to the driver carrier, by the lobe b of the cam 10, merely causes the piston 50 to be displaced downward with respect to its normal position at the top of the bore 46. This relative downward displacement is effected by the continued upward movement of the housing 44 while the piston 50 and shaft 82 remain stationary.

As the cams 10 and 12 continue their rotation, a lobe c on the cam 12 acts on the roll 38 to lower the driver carrier 28, 30 along with the housing 44. The downward movement of the housing 44 retracts the shaft 82 by engagement with the snap ring 88 thus also retracting the drivers L from the work. The upper and lower driver holders 76 and 86 return to their original relative positions under the influence of the springs 78. At this time the solenoid 104 is deenergized by its cam switch, allowing the latch 96 to engage the notch 100 in the shaft 82. As soon as the housing 44 begins its downward movement, the pressure in the bore 46 is relieved, permitting the valve head 66 to close the dump valve 52. While the piston 50 at the end of the shaft 82 moves up in the bore 46 fluid enters the bore from the reservoir through the passages 54 and the check valve 56.

After a relatively short downward movement of the housing 44 sufficient to retract the drivers L from the work and to allow the latch 96 to engage the notch 100, the housing is once again moved up by a lobe d on the cam 10 acting on the roll 42. During this upward movement the drivers S are caused to penetrate the work for the second pricking stroke while the drivers L also penetrate the work through the previously pricked holes with little resistance. As the drivers S approach the end of their pricking stroke, the pressure in the bore 46 once again builds up until the dump valve opens to exhaust fluid during the remainder of the upward movement of the housing 44.

After the second pricking stroke the housing 44 is again lowered by a lobe e on the cam 12 to its original position. During this downward stroke the solenoid 106 is deenergized so that the latch 98 is permitted to engage its notch 102 in the shaft 82. At the same time the solenoid 104 is again energized to retract the latch 96 from its notch so that only the latch 98 will be effective on the driving stroke. When the drivers reach their lowermost positions a loader block (not shown) is moved from its fastener receiving location into its fastener driving position between the ends of the drivers and the bottom of the work support block 94, thus alining a fastener in the path of each driver. Further rotation of the cam shaft 14 raises the housing 44 first raising the ends of drivers L until they are even with the ends of the drivers S whereupon the latch 98 becomes effective to cause the drivers S also to be raised. Continued upward movement of the drivers causes the fasteners to be driven upward and into the previously pricked holes in the work. Since the force required to drive and seat the fasteners flush with the pricked openings is far less than that required to prick the holes, the fluid pressure build up in the bore 46 is insufficient to operate the dumping valve unless the pegs when being driven encounter an obstruction before the pegs are fully driven. Thus, the cams 10 and 12 are designed to raise the drivers just high enough to seat the fasteners flush with the surface of the work. The drivers are thereafter retracted by the return of the housing 44 to its initial position, the holddown member is raised so the finished work may be removed and the fastener loader block is moved to its fastener receiving position where another set of fasteners is formed preparatory to the next cycle of the machine.

Although in the above described specific embodiment of the invention two sets of drivers have been shown to accomplish the pricking operation in two separate strokes, it will be apparent to one skilled in the art that in cases where many fasteners are to be driven, it may be desirable to accomplish the pricking operation in three or more separate strokes, so that the force imparted to the support does not exceed a predetermined maximum.

Although the illustrated embodiment of the invention is particularly adapted for use in heel seat fastening of shoes, it will be understood that the invention is applicable to many other fastener inserting operations.

Having thus described my invention what I claim as new and desire to secure by Letters Patent of the United States is:

1. A fastener inserting machine comprising a driver device having separate driver units, operating means for imparting a pricking stroke and a subsequent driving stroke to each driver unit during each cycle of operation of the machine, said operating means effecting said pricking strokes of the driver units sequentially and effecting said driving strokes simultaneously.

2. A fastener inserting machine comprising a driver device having separate driver units which are operable separately, means for imparting a pricking stroke and a driving stroke to each driver unit during each cycle of operation, means for coupling said driver units after a first pricking stroke in a relationship such that the operative ends of the drivers of the unit that has completed a pricking stroke are disposed rearwardly of the drivers of the unit which is to make the next pricking stroke, and means for subsequently coupling said driver units for the driving stroke in a relationship such that all the operative ends of the drivers are held at the same level.

3. A fastener inserting machine, comprising a reciprocable driver carrier, a driver device comprising a first driver unit which is supported by said carrier, a second driver unit which is mounted in said carrier for yielding movement relative to said first driver unit, operating means for causing said units to perform sequential pricking strokes and a simultaneous driving stroke for each cycle of operation of said operating means, means for coupling said driver units after the first pricking stroke in such a relationship that the drivers of the yieldingly mounted driver unit project beyond the drivers of the other unit, and means operative during the said driving stroke for coupling said driver units in such a relationship that the operative ends of all the drivers are disposed at a common level.

4. In a fastener inserting machine, a reciprocable driver carrier, a driver device comprising one driver unit which is supported by said carrier, a second driver unit which is mounted in said carrier for yielding movement relative to said first-mentioned driver unit, operating means for imparting a pricking stroke for each driver unit and a subsequent driving stroke to said carrier for each cycle of operation of said operating means, and means for selectively coupling said driver units in one relationship in which their operative ends are offset from each other and in another relationship in which their operative ends are flush with each other, said coupling means comprising latches which are alternately operated in timed relation to said operating means, said latches being associated with one driver unit and being selectively engageable with the other driver unit.

5. In a fastener inserting machine, a fastener driving head comprising two driver units, a holder for each of said units, a carrier in which said holders are mounted for movement relatively to each other and relatively to said carrier, operating mechanism for imparting dual pricking strokes and a driving stroke to said carrier for each cycle of operation of said mechanism, means for coupling said driver holders in one relationship wherein the operative ends of the drivers of one driver unit extend beyond the drivers of the other unit and in a second relationship in which the operative ends of the drivers of both units are flush with each other, and means operated in synchronism with said operating mechanism for operating said coupling means to establish the first-mentioned relationsip between said drivers during the second pricking stroke and to establish their second relationship during the driving stroke.

6. In a fastener inserting machine, a fastener driving head comprising a pair of holders each of which retains a set of drivers, a carrier in which one of said holders is mounted to yield with respect to the other holder and said carrier, means for locking said driver holders against movement relatively to each other in one relationship wherein the drivers of the first-mentioned driver holder project beyond the drivers of the other driver holder and in a second relationship in which the operative ends of all the drivers are flush with each other, operating mechanism for imparting dual pricking strokes and a driving stroke to said carrier for each cycle of operation of said mechanism, and means actuated by said operating mechanism for operating said locking means to effect the above-mentioned relationships between said driver holders in the order named during the second pricking stroke and the driving stroke, respectively.

7. In a fastener inserting machine, a fastener driving head comprising two driver units, a carrier for said units upon which carrier one of said units is yieldingly mounted, operating mechanism for imparting dual pricking strokes and a driving stroke to said carrier for each cycle of operation of said mechanism, means for supporting the other driver unit upon said carrier for movement therewith, means for coupling said driver units so that the drivers of the said yieldingly mounted unit project beyond the drivers of said other unit, means for coupling said driver units so that the operative ends of their drivers are flush with each other, and means operated in synchronism with said driver operating mechanism for selectively rendering said coupling means effective during the second pricking stroke and the driving stroke, respectively.

8. In a fastener inserting machine, a fastener driving head comprising two driver units, a holder for each of said units, a carrier upon which said units are mounted, operating mechanism for imparting dual pricking strokes and a driving stroke to said carrier for each cycle of operation of said mechanism, lost motion force transmitting means disposed between said carrier and one holder for supporting that holder upon said carrier for movement therewith until a predetermined driving force is developed and then to permit lost motion of said carrier relatively to that holder, means for biasing the other holder away from the said one holder, a pair of latches associated with one of said holders and mounted for movement into and out of operative relation to the other holder to lock said holders against relative movement, means for biasing each of said latches into its operative position, latch retracting means for normally holding said latches in their inoperative positions, and means actuated by said carrier operating mechanism for selectively operating said latch retracting means to cause said driver units to be coupled in different relative positions during the second pricking stroke and the driving stroke.

9. A machine for attaching an article to a work piece by means of a plurality of fastening devices, comprising individual sets of driver units, means operating said units separately to prepare positions for receiving said fastening devices and means for subsequently operating said units simultaneously to apply said fastening devices to said positions.

10. A machine for attaching an article to a work piece by means of a plurality of fastening devices, comprising a pair of driver units, means for operating said units separately to punch apertures in said work piece, and means for subsequently operating said units simultaneously to apply fastening devices to all of said apertures simultaneously.

References Cited in the file of this patent

UNITED STATES PATENTS

| | | |
|---|---|---|
| 2,162,898 | Rotter | June 20, 1939 |
| 2,292,294 | Rotter | Aug. 4, 1942 |
| 2,943,329 | Spencer | July 5, 1960 |
| 2,956,284 | Strout | Oct. 18, 1960 |
| 2,980,132 | Prijatel | Apr. 18, 1961 |